United States Patent
Balasubramanian et al.

(10) Patent No.: US 9,696,967 B2
(45) Date of Patent: Jul. 4, 2017

(54) GENERATION OF AN APPLICATION FROM DATA

(71) Applicant: MICROSOFT TECHNOLOGY LICENSING, LLC, Redmond, WA (US)

(72) Inventors: Barath Balasubramanian, Bothell, WA (US); Evan Bjorn-Thomas Cohen, Seattle, WA (US); Radu Bogdan Gruian, Sammamish, WA (US); Mohammed Amine Benmouffok, Bellevue, WA (US); Olivier Colle, Bellevue, WA (US); Gregory S. Lindhorst, Seattle, WA (US); Muralidhar Sathsahayaraman, Bothell, WA (US); Unnati J. Dani, Bellevue, WA (US); Alexander J. Dobin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/936,111

(22) Filed: Nov. 9, 2015

(65) Prior Publication Data

US 2017/0131975 A1    May 11, 2017

(51) Int. Cl.
 *G06F 9/44*    (2006.01)
(52) U.S. Cl.
 CPC ...................... *G06F 8/30* (2013.01)
(58) Field of Classification Search
 CPC .......................................................... G06F 8/30
 USPC ....................................................... 717/106
 See application file for complete search history.

(56) References Cited

U.S. PATENT DOCUMENTS

| | | | | |
|---|---|---|---|---|
| 6,954,896 B1* | 10/2005 | Dodrill | ................... | G10L 15/22 704/270 |
| 7,281,245 B2* | 10/2007 | Reynar | ..................... | G06F 8/65 717/169 |
| 7,475,075 B2* | 1/2009 | Lindhorst | ............. | G06F 9/4443 |
| 7,712,016 B2* | 5/2010 | Jones | ...................... | G06F 17/24 715/200 |
| 7,886,222 B2* | 2/2011 | Bagare | ...................... | G06F 8/10 715/234 |
| 7,954,046 B2* | 5/2011 | Collie | ................. | G06F 17/2229 707/999.1 |

(Continued)

FOREIGN PATENT DOCUMENTS

WO    2012148867 A1    11/2012

OTHER PUBLICATIONS

"Building Mobile Apps with Google Sheets | AppSheet." YouTube. YouTube, Feb. 2, 2015. https://www.youtube.com/watch?v=_p_xlJ9PivM.*

(Continued)

*Primary Examiner* — Francisco Aponte

(57) ABSTRACT

Examples of the disclosure provide for receiving a data set at a design surface from a data source, and inferring a first data type from the data set. A first control type is generated for the inferred first data type. A second data type is inferred from the data set and a second control type is generated for the inferred second data type, with the first control type and the second control type being different. A layout is generated for an application document that includes the first control type and the second control type.

20 Claims, 13 Drawing Sheets

(56) References Cited

U.S. PATENT DOCUMENTS

| | | | | |
|---|---|---|---|---|
| 8,302,072 | B2* | 10/2012 | Chandhoke | G06F 8/34 715/763 |
| 8,484,612 | B2* | 7/2013 | Dellostritto | H04L 67/10 717/106 |
| 8,542,411 | B2* | 9/2013 | Sisco | H04N 1/32133 235/494 |
| 8,683,318 | B1* | 3/2014 | Dasari | G06F 8/30 715/234 |
| 8,689,137 | B2* | 4/2014 | McCormack | G06F 3/0481 715/810 |
| 8,751,925 | B1* | 6/2014 | Zhang | G06F 17/227 715/234 |
| 8,954,841 | B2* | 2/2015 | Jiang | G06F 8/51 715/221 |
| 8,978,006 | B2 | 3/2015 | Hirsch et al. | |
| 9,026,897 | B2* | 5/2015 | Zarras | G06F 17/246 715/219 |
| 9,286,032 | B2* | 3/2016 | Feblowitz | G06F 8/20 |
| 9,348,561 | B2* | 5/2016 | Sos-Munoz | G06F 8/00 |
| 2003/0056177 | A1* | 3/2003 | Nara | G06F 17/212 715/255 |
| 2006/0150149 | A1* | 7/2006 | Chandhoke | G06F 8/34 717/109 |
| 2007/0061740 | A1 | 3/2007 | Marini | |
| 2009/0125796 | A1* | 5/2009 | Day | G06F 9/4443 715/219 |
| 2009/0327328 | A1* | 12/2009 | Woodall | G06F 17/218 |
| 2010/0107086 | A1 | 4/2010 | Chen et al. | |
| 2010/0162142 | A1* | 6/2010 | Cooper | G06F 8/38 715/762 |
| 2010/0211862 | A1* | 8/2010 | Parish | G06F 17/246 715/212 |
| 2011/0083167 | A1 | 4/2011 | Carpenter et al. | |
| 2012/0278701 | A1* | 11/2012 | Bockus | G06F 17/218 715/235 |
| 2013/0073614 | A1 | 3/2013 | Shine et al. | |
| 2013/0262626 | A1* | 10/2013 | Bozek | H04L 67/10 709/217 |
| 2014/0026041 | A1* | 1/2014 | Bhargav | G06F 17/211 715/255 |
| 2014/0032640 | A1* | 1/2014 | Dooley | G06F 9/4411 709/203 |
| 2014/0108971 | A1* | 4/2014 | No | G06F 3/0482 715/762 |
| 2014/0380139 | A1* | 12/2014 | Mondri | G06F 17/246 715/212 |
| 2015/0074546 | A1* | 3/2015 | Slawson | G06F 3/0484 715/747 |
| 2015/0074635 | A1 | 3/2015 | Margiotta et al. | |
| 2015/0134707 | A1* | 5/2015 | Doherty | G06F 8/34 707/806 |
| 2015/0317289 | A1* | 11/2015 | Jones | G06F 17/24 715/234 |
| 2016/0055128 | A1* | 2/2016 | Bhargav | G06F 17/211 715/273 |
| 2016/0188302 | A1* | 6/2016 | Fredrick | G06F 8/34 717/107 |

OTHER PUBLICATIONS

"Building Mobile Apps with Google Forms and AppSheet | AppSheet" YouTube. YouTube, Apr. 13, 2015. https://www.youtube.com/watch?v=oH3AUl1odv0.*

"Make an App with AppSheet: 3.31.16 webinar | AppSheet" YouTube. YouTube, Apr. 1, 2016. https://www.youtube.com/watch?v=37dxlY0t3ml&list=PLZ81nepkT97Jie3V-A0yK7wus8s-VNyhj&index=9.*

AppSheet-Basic Concepts—2016. https://appsheethelp.zendesk.com/hc/en-us.*

AppSheet—How It Works—2016 https://www.appsheet.com/HowItWorks.*

Appsheet: Efficient use of web workers to support decision making Alexander J. Quinn, Benjamin B. Bederson—University of Maryland, Department of Computer Science; Human-Computer Interaction Lab—College Park, MD—2011.*

"Appsheet", Retrieved on: Aug. 31, 2015, 3 pages Available at: http://www.appsheet.com/content/howitworks.

"Googlesheets", Retrieved on: Aug. 31, 2015, 1 page Available at: https://chrome.google.com/webstore/detail/appsheet/apemmfgpjhplakdihblplkjbakedfehh?hl=en-US.

Samuda, Robyn-Dale, "STOIC—Create Apps on the Fly with Your Spreadsheet Data", Published on: Feb. 28, 2014, 7 pages Available at: http://www.bloggingpro.com/archives/2014/02/28/stoic-create-apps-from-spreadsheet-data/.

"4 Reasons Why You Should Turn Excel into Web Apps Now", Published on: Oct. 29, 2014, 3 pages Available at: http://blog.caspio.com/paas-in-action/4-reasons-why-you-should-turn-excel-into-web-apps-now/.

"Zengine", Published on: Apr. 27, 2015, 11 pages Available at: https://www.getapp.com/operations-management-software/a/zengine/.

Barbierri, Cody, "DEMO: Cloudbasic Makes Building Business Cloud Applications Easy", Published on: Sep. 14, 2010, 6 pages Available at: http://venturebeat.com/2010/09/14/demo-cloudbasic/.

"Knack", Retrieved on: Aug. 31, 2015, 13 pages Available at: https://www.knackhq.com/features/.

Cohen, Reuven, "Build Your Own Web or Mobile App in Minutes With These Cloud Based Tools", Published on: Mar. 22, 2013, 7 pages Available at: http://www.forbes.com/sites/reuvencohen/2013/03/22/build-your-own-web-or-mobile-app-in-minutes-with-these-cloud-based-tools/.

"Clouder", Retrieved on: Aug. 31, 2015, 5 pages Available at: https://www.crunchbase.com/organization/clouder-io.

"QuickBase", Retrieved on: Aug. 31, 2015, 2 pages Available at: https://www.quickbase.com/help/default.html#create_database_from_scratch.html.

Santos, Jose Maria Delos, "Top 5 Online App Builders for Creating your Own PM Tool", Published on: Mar. 10, 2015, 6 pages Available at: http://project-management.com/top-5-online-app-builders-for-creating-your-own-pm-tool/.

Stanoev, Kiril, "Using Google Spreadsheets as Data Source in Your Android App", Published on: Jan. 21, 2015, 6 pages Available at: http://www.telerik.com/blogs/google-spreadsheet-as-data-source-android.

Cheng, et al., "An Abstract Domain to Infer Types Over Zones in Spreadsheets", In the Proceedings of Static Analysis, Sep. 11, 2012, pp. 94-110.

Kandel, et al. "Profiler: Integrated Statistical Analysis and Visualization for Data Quality Assessment", In Proceedings of the International Working Conference on Advanced Visual Interfaces, May 21, 2012, 8 Pages.

"International Search Report and Written Opinion Issued in PCT Application No. PCT/US2016/060210", Mailed Date: Feb. 7, 2017, 16 Pages.

* cited by examiner

| DATA/CONTROL TABLE 500 | | |
|---|---|---|
| DATA TYPE | DEFAULT CONTROL TYPE | OTHER CONTROL TYPE(S) |
| DATE | CALENDAR | LABEL |
| ADDRESS | MAP | PICTURE |
| STRING | TEXT BOX | LABEL |
| IMAGE | PICTURE | TEXT BOX |
| BOOLEAN | TOGGLE SWITCH | |
| LIST (3+ VALUES) | DROP DOWN MENU | GALLERY |
| | | |
| | | |

FIG. 5

GENERATION OF AN APPLICATION FROM DATA

BACKGROUND

Creating an executable computer program generally involves generating algorithms, verifying the correctness of the algorithms, and implementing the algorithms into a programming language. This process often requires expertise in many areas, including coding in the target programming language. For example, in an Integrated Developer Environment such as MICROSOFT VISUAL STUDIO, a designer exists to create a user interface form for an application. Typically, application data is obtained from a database with metadata, and the metadata is used to generate forms for the different types of data within the database.

Spreadsheet software such as MICROSOFT EXCEL has allowed for users to input data into cells without specifying a data type, and in some cases infers a data type for the input data to change the format of a cell automatically. For example, a series of six consecutive numerals within a cell is often automatically formatted as a date using a default date format. The default date format may be changed to a different date format by a user selecting from a list of available date formats, or the formatted cell may be changed by a user selecting a different data type, such as a currency rather than a date for the numbers within the cell. However developer environments may require data from a spreadsheet to be imported into a relational database that provides the metadata needed to create the user interface form for the application.

Presentation software such as MICROSOFT POWER POINT has allowed for users to generate slides using modifiable templates, or in some cases create slides from a blank slide document by inserting components and data manually. However, because presentation software is usually focused on a static presentation of data, there is often no concern with providing dynamic data or opportunities for user interaction to affect data.

SUMMARY

Examples of the disclosure provide a system and method for automatically generating an application from data. Applications are generated automatically using source data received within the developer environment, such as on the design surface. Data types are inferred from analysis of the data itself, and controls are automatically generated for the inferred data types, to provide a modifiable application document, such that a user may modify visual elements, layout, and even data access for the application without having to write any code. The application document is editable and modifiable, allowing a user to continue building and exposing or hiding functionality of the application to customize and application through continued manipulation of visual controls and elements. Because the application is generated automatically, including the controls based on inferred data types, they are likely to involve less error at generation and at runtime. In addition, because the application is generated automatically, including the forms for modifying the layout and functionality, the application may also be optimized for runtime efficiency. Further, because the application is automatically generated, application behaviors such as modifiable data access may be generated with less intrinsic knowledge of the system, and of coding in general.

Aspects of the disclosure provide a developer environment that any user, regardless of development experience or lack thereof, may utilize to create applications. General workplace computing skills, similar to skills employed when using MICROSOFT OFFICE or similar programs, are translated into a development environment. Because the applications are generated automatically from data, and may use data in a two-dimensional flat table or otherwise outside a relational database, they further increase efficiency of a developer or user in development of an application. In addition, the development environment is translated to a non-developer user in such a way as to provide application development for any user, increasing the speed of application development. Faster application development may save time for the user, and ultimately use less processor cycles and machine resources.

For example, a user may start with an identified data source and provide a data set to design an application around, such that aspects of this disclosure create an application around the selected data set, based on source data design or layout, providing the user with the capabilities to view, add, delete, and sort data from the data set within the automatically generated application. Using skills typically already developed in using presentation software to create a slide show presentation, a user visually modifies the layout of the application and how application content is presented. Aspects of the disclosure automatically generate the expressions for the application behavior based on user selections and placements of components, providing a modifiable application document that a user may continue to customize to interact with the data set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an exemplary table illustrating a data control table for mapping inferred data types to control types.

Corresponding reference characters indicate corresponding parts throughout the drawings.

DETAILED DESCRIPTION

Referring to the figures, examples of the disclosure enable the creation of an application from data. Generating an application using code generally requires a knowledge of programming, data capabilities and compatibilities, and so forth. Aspects of the disclosure provide for automatic generation of an application using source data itself to infer data types and automatically generate controls and layouts along with associated logic based on the inferred data types, providing a modifiable application document for user customization.

Additionally, the examples described herein enable applications to be generated and/or modified in an efficient and effective manner using selected data as a starting point for application design. By generating and/or modifying an application as described in this disclosure, some examples reduce processing load and/or increase processing speed by strategically managing computational, processing, memory, and/or other resources. The effect of identifying and inferring types of data from a selected data set, used to automatically generate an application with controls for the inferred data types, improves performance of the application as well as the device hosting the application. Additionally, some examples may conserve memory, reduce network bandwidth usage, improve operating system resource allocation, and/or improve communication between computing devices by streamlining at least some operations, such as automated generation of application controls based on an inferred data type of selected or imported data, by automating at least some operations.

Figure 1:
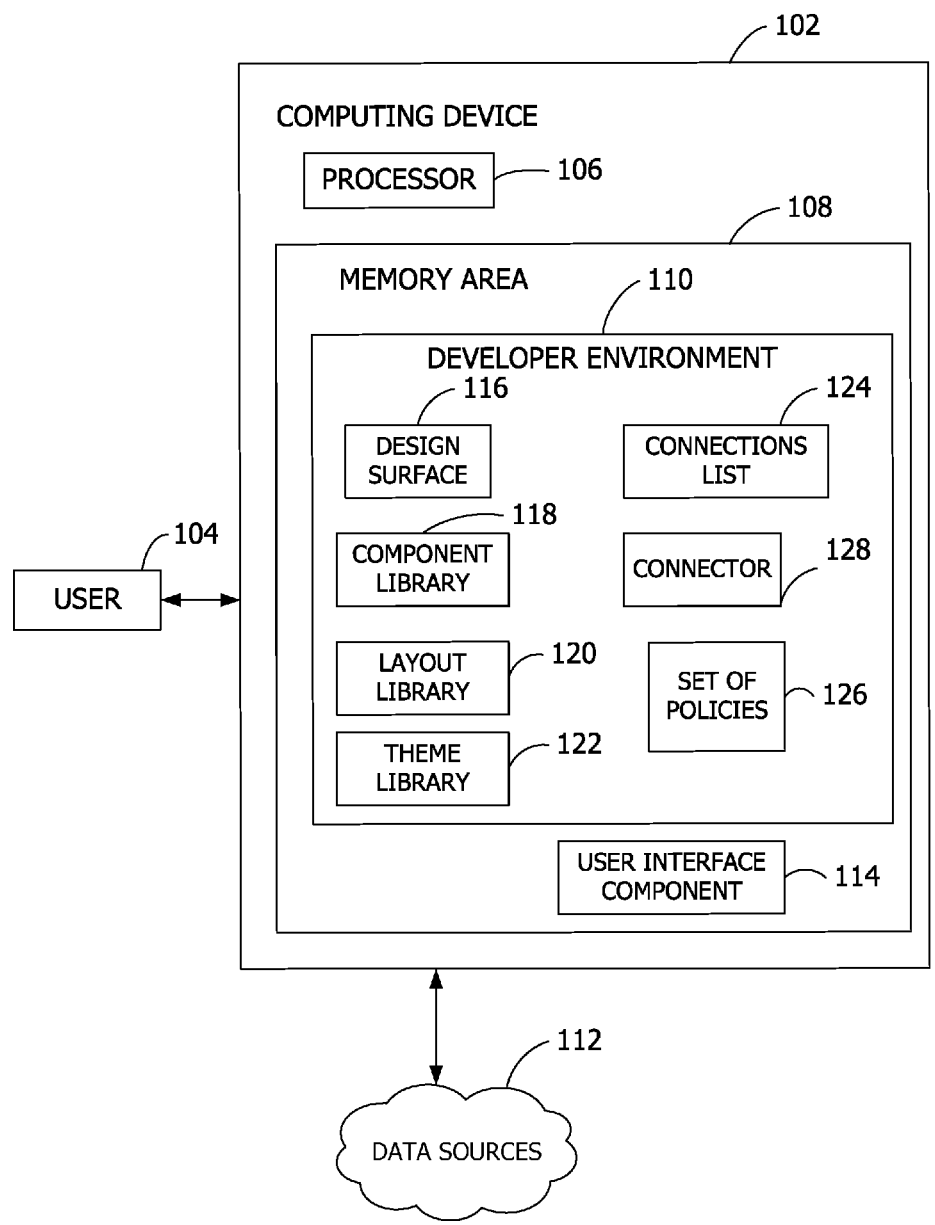
FIG. 1 is an exemplary block diagram illustrating a computing device for generating an application.

Referring again to FIG. 1, an exemplary block diagram illustrates a computing device for generating an application. In the example of FIG. 1, the computing device 102 associated with a user 104 represents a system for application design. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor 106, a memory area 108, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 3 and FIG. 4).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include developer environment 110, which may represent an application for designing other executable applications. The applications may communicate with counterpart applications or services such as web services accessible via a network (not shown). For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. Data sources 112 may represent any type of data source accessible by computing device 102, whether at another computing device, in a cloud, at a network storage location, or any other suitable data storage location. In some examples, the memory area may store data sources 112, or a subset of data sources 112, which may represent data stored locally at memory area 108. In other examples, memory area 108 may store data access points associated with data stored remote from computing device 102 at data sources 112, or any combination of local and remote data.

The memory area further stores one or more computer-executable components. Exemplary components include a user interface component. The user interface component 114, when executed by the processor 106 of computing device 102, cause the processor 106 to perform operations, including to receive user selections during user interaction with developer environment 110, for example.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface.

Developer environment 110 provides design tools and a design environment for application design and generation.

In some examples, developer environment 110 includes design surface 116, component library 118, layout library 120, theme library 122, connections list 124, and set of policies 126. Design surface 116 may be an interactive canvas or interactive design surface of developer environment 110. In some examples, design surface 116 is part of an interactive graphical user interface displayed on an interactive computing device. For example, design surface 116 may be an interactive surface communicatively coupled to a gesture detection mechanism, such as gesture detection component of a touchscreen, such that gestures detected are used to communicate interaction with the developer environment, or elements of the developer environment.

Component library 118 may include one or more application components or controls, which may be selected or used in application design. In some examples, component library 118 may have templated components that may be selected and customized with data via user interaction with design surface 116. Example components may include, without limitation, text controls, gallery controls, visual layout controls, animation controls, navigation controls, labels, and the like. As one example, component library 118 includes a toggle switch, which is a graphical element that provides an indication or exposure of some Boolean logic, usually as a yes/no or true/false indication. With a toggle switch, selection of one value between two possible values is made by selecting one side of the switch or the other, or by moving the indicator from one side to the other, with the two sides of the switch associated with the two different possible values, in this example. As used herein, component may refer to a control, an object, an entity, or any component that may be used in an application or program, whether during design or at runtime.

Layout library 120 may include one or more application layouts, or visual layouts, associated with visual placement of application controls as well as visual placement of data within application controls. Layout library 120 may have templated visual layouts that may be selected or customized with data via user interaction with design surface 116. For example, one type of component from component library 118 may be a list component, which may be associated with several different visual layouts from layout library 120. A default list layout may be used when automatically generating a list control for selected data, in some examples, with layout library 120 providing the different selectable list layouts at design surface 116 in an edit mode for a user to select a different visual layout of the data within the list control.

Theme library 122 may include one or more application themes, or visual components other than layout, such as color schemes, font selections, font sizes, visual effects, and the like. For example, theme library 122 may provide a list of different visual themes for an application design, which may be selectable via design surface 116 during customization of the automatically generated application.

Connections list 124 identifies data source locations, such as data sources 112, where data may be identified for import into developer environment 110 for application design using the imported data. Design logic of developer environment 110 may identify data sources 112 and provides the identified data source locations as connections list 124, in some examples. In other examples, user 104 may provide credentials for access and connection to one or more data source locations at data sources 112, which may become part of connections list 124 for future use.

Developer environment 110 may include connector 128, a connection service that creates a connection provider between the developer environment and a data source. For example, the connector may create a connection provider between the developer environment and a social media site or a customer relationship management system, such that the social media site or the customer relationship management system becomes a selectable data source of connections list 124. Connector 128 may create connections, and connection providers, using a consent flow or authorization flow to obtain authentication data and connect to a connection, in some examples. In other examples, a connection may be specific to a tenant in the cloud, set up by the user, or set up by an organization and opaque to the user, providing credentials to connect to the data source. The connection providers created by connector 128 may convert data from a data source into a two-dimensional table for use by developer environment to transform the data from a two-dimensional table into an automatically generated application that is modifiable and customizable by the user.

In one embodiment, data sources 112 may be discovered by developer environment 110 based on user credentials associated with user 104. For example, user 104 may log-in to developer environment 110 with user credentials associated with a user profile accessible by developer environment 110. In this example, the user profile may store data source locations and associated credentials that user 104 has previously used in interacting with developer environment 110. In other examples, developer environment 110 may detect a data source location associated with user 104 based on user credentials, and prompt user 104 to provide access to the detected data source location via design surface 116. In still other examples, developer environment 110 may be associated with an enterprise network, and one or more data source locations corresponding to the enterprise network may be provided as some of the data sources locations available for selection in connections list 124. In another embodiment, data sources 112 may be provided to developer environment 110 by a discovery service, and developer environment may expose data sources 112 as connections list 124 at design surface 116.

Developer environment 110 identifies data sources, identifies data sets from the data sources for import, and infers data types for imported data sets based in part on set of policies 126. Set of policies 126 may include, without limitation, rules, parameters, and constraints for analyzing data, inferring data types, identifying subsets of data for incorporation into a generated application, selecting a layout, and/or any other operation associated with automatic generation of an application from data. At least some of the policies in set of policies 126 include rules and parameters associated with historical data sources associated with a user, types of data associated with types of data values, permissions, data sensitivity, data restrictions, how the application is using the data, a type of data being captured by the application, or any other suitable parameter.

At least some of the policies in set of policies 126 include a set of constraints used to identify relevant subsets of data from selected data sets for incorporation into a generated application. The set of constraints may include display constraints, performance constraints, and telemetry constraints. Display constraints may be associated with the display and/or layout within the generated application, such as vertical display screen real estate for example. Performance constraints may include constraints on an anticipated number of entities or expressions that may be introduced in a generated application, a measure of complexity of application controls, a measure or number of data binding between subsets of data, or any other suitable performance constraint. Telemetry constraints may include learned knowledge associated with other users or previously developed applications from data within developer environment 110, or other instances of developer environment 110, for example. As an example, a telemetry constraint may be learned knowledge that users in similar development situations prefer specific combinations of columns or column types.

In some examples, design logic of the developer environment uses the set of constraints, along with the inferred data types, and/or metadata of the input data set, to generate application logic that checks whether end user input is acceptable to the data source. Different checks may be made by the generated application logic of the automatically generated application, including but not limited to whether a data capture field is designed to require a value, whether a value may be properly converted to an inferred data type, and whether a data field contains a value within an acceptable range based on parameters or other rules included within the set of constraints. For example, a data capture field may be designed to require a value in order for an application logic check to allow submission of the input data. In other examples, data input of text into a data input field that is bound to numeric values may return an incorrect result at the application logic check. In yet another example, a data filed may have a parameter that defines an acceptable range, such as a data field that defines the acceptable range of values to be within a certain time period.

The generated application logic may provide feedback to an end user to prompt a user to correct data input before submission to the data source, for example. The application logic may also be configured to block data submission to the data source if a prompted correction is not made, in some examples. After submission to the data source, the data source may detect an issue with submitted data, which may be communicated to the application logic. The application logic may then provide feedback to the end user about the issue and possibly suggestions for correction. Feedback may take many forms, such as visual, audio, or tactile alerts, for example, or other suitable notifications provided via electronic messaging, instant messaging, pop-up notifications, and the like.

In other examples, design logic uses the set of constraints, along with the inferred data types, and/or metadata of the input data set, to determine an initial layout to select for the automatically generated application. This layout selection may be based on: a type of data; a quantity of data, such as a total width of a data set in columns for example; what will be done with the data; or similar heuristics, for example. Additionally, some metadata may be included with the input data set that indicates one or more columns of the input data are desired for inclusion, or otherwise provides additional data for use by design logic in determining a layout selection.

User 104 points to a data source, selects a data set, and developer environment 110 builds out an application document that the user may then modify. In other words, using data selected by a user, developer environment 110 automatically generates a customizable application template from the selected data. User 104 may then share the application, or publish the application, and may still further customize the application using the application document generated from the data.

Figure 2:
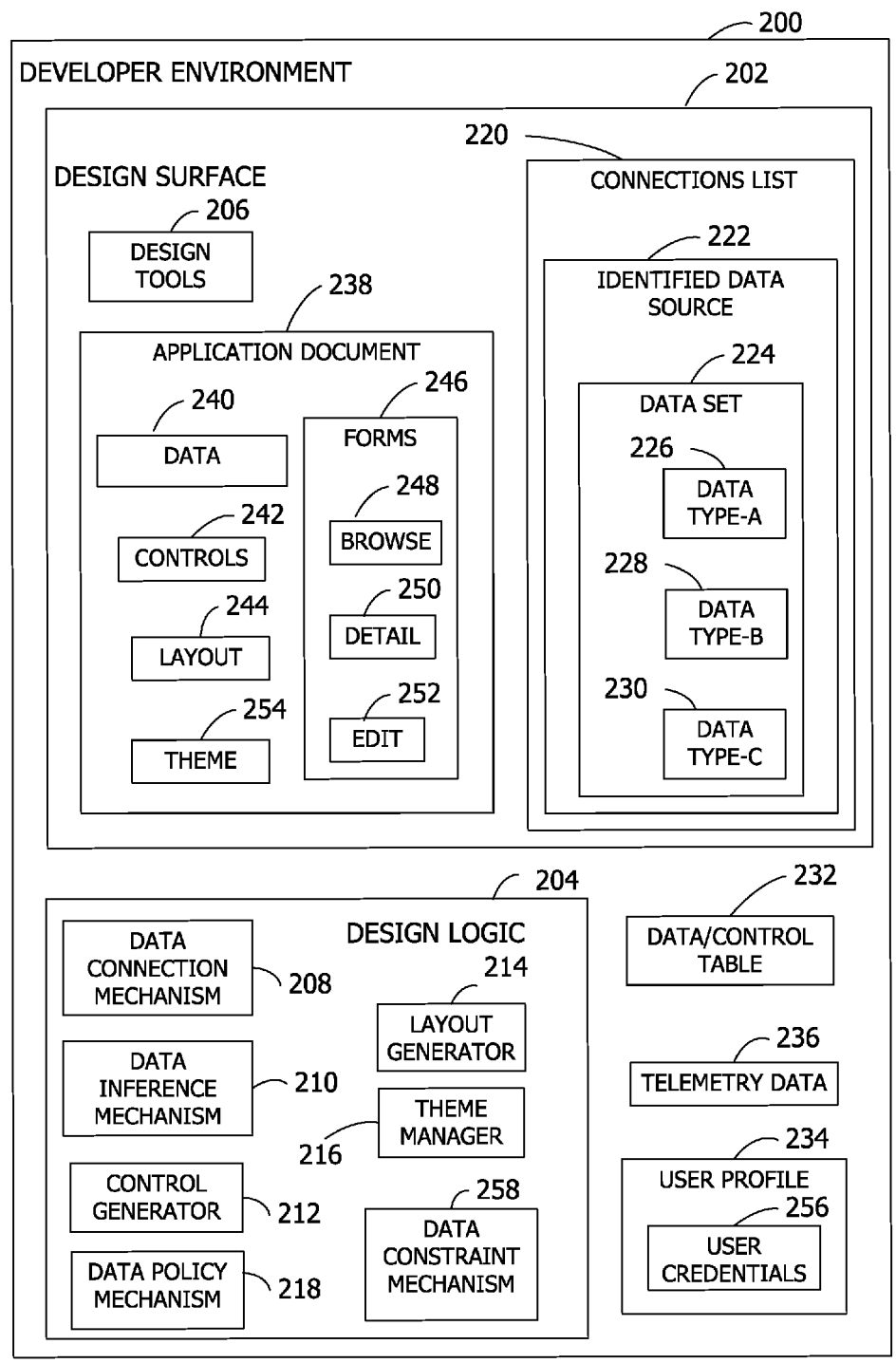
FIG. 2 is an exemplary block diagram illustrating a developer environment for generating an application from data.

FIG. 2 is an exemplary block diagram illustrating a developer environment for generating an application from data. Developer environment 200 is an illustrative example of one implementation of developer environment 110 in FIG. 1. Developer environment 200 includes design surface 202 and design logic 204.

Design surface 202 may be an interactive canvas for receiving source data, providing a modifiable application document, and receiving interactions with the source data and modifiable application document. For example, design surface 202 may be a portion of developer environment 200 that is displayed via a user interface and is configured to receive user interaction. Design surface 202 may include design tools 206, which may be application resources of developer environment 200. For example, design tools 206 may include component library 118, layout library 120, and theme library 122 of FIG. 1.

Design logic 204 may include a number of algorithms, rules, and parameters for automatically generating an application using received source data, data types for subsets of the source data, and generating controls for the inferred data types as part of the automatically generated application, such that the generated application is automatically designed based on the data itself. For example, design logic 204 may include, without limitation, data connection mechanism 208, data inference mechanism 210, control generator 212, layout generator 214, theme manager 216, and data policy mechanism 218.

In an exemplary operation, design surface 202 may receive a connections list 220 via data connection mechanism 208. Connections list 220 may provide one or more identified data sources for selection of data for application design. Identified data source 222 is an illustrative example of one possible data source, such as a cloud storage location for example. Design surface 202 provides connections list 220 as an interactive list that may expose selectable data or data sets stored at identified data source 222. Design surface 202 receives a selection of data set 224 and imports data set 224 into developer environment 200.

Data inference mechanism 210 analyzes data set 224 to identify one or more subsets of data and infer a data type for each identified subset of data. As an illustrative example, data inference mechanism 210 may infer data type-A 226 data type-B 228 and data type-C 230 from data set 224. In other examples, more than three data types may be inferred, or less than three data types may be inferred. Data set 224 is an illustrative example and not intended to provide any limitations on the number of subsets of data that may be contained within a data set, or the number of different data types that may be inferred from a single data set.

In one embodiment, data inference mechanism 210 analyzes the data itself from data set 224, parsing the values of data set 224 to infer different types of data, if applicable, and infer a specific data type for each identified subset of data. For example, data set 224 may be a spreadsheet document and data inference mechanism 210 may analyze and parse each cell in a given column of the spreadsheet to determine that all of the cells within the given column have one of two values. Data inference mechanism 210 may infer that the data type for the given column is Boolean logic in this example. In another example, data inference mechanism 210 may identify the specific value of cells, such that the cells within the given column have either a value of yes or no, and infer Boolean data type from that type of analysis. In yet another example, data inference mechanism 210 may parse another column of the spreadsheet to determine that the cells of that other column all contain numerical values. Data inference mechanism 210 may identify a pattern of the numerical values, such as a sequence that is typically found in dates or timestamps, and infer a calendar date for the data in the other column. These are just a few of many possible examples of data inference mechanism 210 parsing the data itself to infer a data type for data or subsets of data within data set 224.

Control generator 212 uses the inferred data types from data inference mechanism 210 to generate a control type for an inferred data type. In some examples, control generator 212 may use data control table 232 to identify a control type for an inferred data type. Data control table 232 may be a table that maps a data type to one or more control types suitable for the data type, for example. In other examples, control generator 212 may generate a control type based in part on user data from user profile 234, such as past user selection of control types for specific data types, or based in part on telemetry data 236. For example, telemetry data 236 may provide a default control type used frequently with an inferred data type.

Layout generator 214 uses the controls generated by control generator 212 to provide a visual layout of the generated controls and data set 224. Design surface 202 provides application document 238, which visually exposes data 240 from data set 224, generated controls 242 from control generator 212, and layout 244 from layout generator 214 as application document 238. Application document 238 is a modifiable application automatically generated by design logic 204 using data set 224. As used herein, automatically refers to a process that occurs without user or administrator intervention. In other words, a selection of data is received at design surface 202 and application document 238 is generated by design logic 204 using the received data, with no other outside intervention.

Application document 238 is automatically generated to include forms 246. Forms 246 provide parameters and visual guidance for modifying application document 238. For example, forms 246 may include browse 248, detail 250, and edit 252. Browse 248 is a form, or page, of application document 238 that provides for visual search and viewing of data set 224. Detail 250 is a form, or page, of application document 238 that provides for visual viewing of sub-data, or details of data set 224, such as drilling down into records to expose different aspects of that record. As an example, a data set may include a number of records, which may be scrolled through or scanned at a high level using browse 248. In this example, the details of an individual record may be viewed using detail 250. Edit 252 provides a form, or page, for modifying data 240, controls 242, layout 244, and/or theme 254 within application document 238. Theme 254 is selected by theme manager 216. Theme 254 may be a default theme, or a selected theme, in these examples.

Telemetry data 236 may include machine learning information derived from analysis of a distributed developer environment and previous applications generated using data. For example, telemetry data 236 may include information on what data types were inferred, whether the inference was corrected or confirmed, what types of controls were generated for what types of data, what types of layouts were used for what types of data, and so on. User profile 234 may include historical information corresponding to user interaction with developer environment 200, as well as other user information, such as user credentials 256. Historical information may include who a user has shared previously generated applications with, where a user has previously selected data or a portion of data from, and other historical application design and development information associated with the user. In some examples, the user intent may be determined in part based on past user interactions with the developer environment or past user selections corresponding to the selected data, user modifications to automatically generated application documents, or both. The user intent may be inferred by data on past user selections or interactions via data collected through application analytics in association with the user profile. In other examples, the user intent may be determined based on telemetry, such as the a data type inference for a given value or set of values used with some frequency or selected over other data types by other users, the generated controls for data types that were modified or confirmed via user interaction, and/or the other parameters, selections, and data used in the current application design.

Data policy mechanism 218 enforces policies attached to source data, such as data set 224, as well as any other policies, such as user policies, enterprise policies, and the like. Data constraint mechanism 258 uses a number of methods to determine which columns of data from the selected data set are subject to the initial application generation, or application document generation. Not all columns are subjected to control generator 212, in some examples. Data constraint mechanism 258 employs one or more constraints from a set of constraints, such as a set of constraints from set of policies 126 in FIG. 1 for example, to identify a relevant set of columns for application generation. For example, a set of constraints may be employed to find a relevant set of columns, such as: total size or width of the data set in columns; metadata on the data set that indicates which columns may be considered required; constraints on what may be displayable, such as non-hidden columns and columns that may be relevant to an end user; display constraints within the generated application, for example vertical real estate; performance constraints, such as the anticipated number of entities and expressions to be introduced in the generated application; some measure of complexity of the cards that each relevant column of data binds to; or telemetry constraints, such as the knowledge that users in similar scenarios prefer specific combinations of columns or column types.

Control generator 212 may use the inferred data types from data inference mechanism 210, as well as the set of relevant fields determined by data constraint mechanism 258, to generate a control type for an inferred data type, in these examples.

Figure 3:
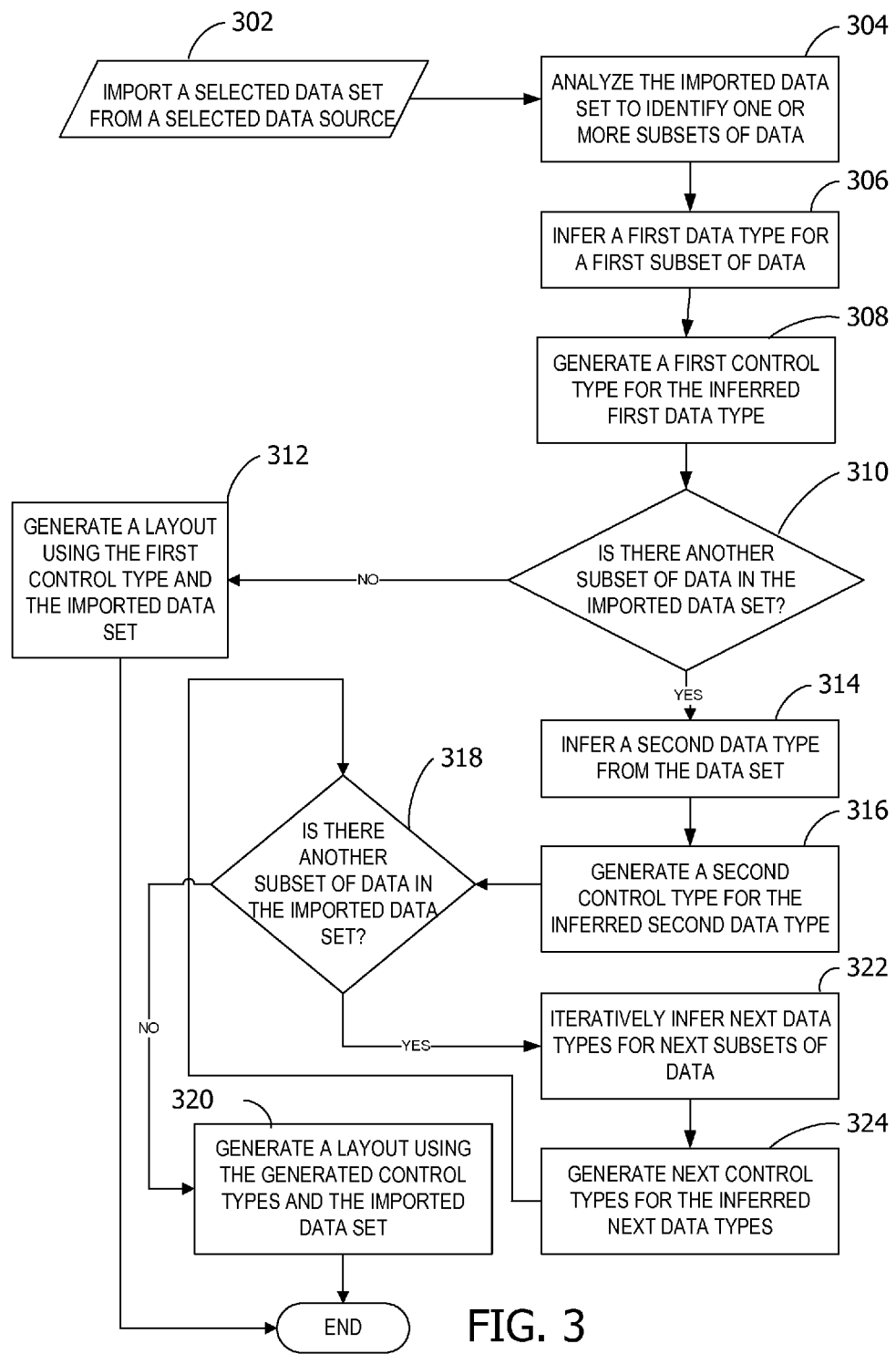
FIG. 3 is an exemplary flow chart illustrating operation of the computing device to import data and generate an application using the imported data.

FIG. 3 is an exemplary flow chart illustrating operation of the computing device to generate an application from data. One or more components described in FIG. 1 or FIG. 2 perform the exemplary operations described below.

The process begins by importing a selected data set from a selected data source at operation 302. The selected data set may be identified by user selection of a data source from a connections list provided at a design surface, and further selection of the data set from the user selected data source to generate an application.

The process analyzes the imported data to identify one or more subsets of data at operation 304. As an example, the data set may be a spreadsheet having a plurality of columns, and the process may parse the plurality of columns and analyze the values within the plurality of columns to identify different subsets of data. For example, an individual column may be considered an individual subset of data, in the example of a spreadsheet. In other example, where the imported data set is a set of tables, an individual table may be considered as an individual subset of data.

The process then infers a first data type of a first subset of data at operation 306. The inference of the first data type is performed by a component, such as data inference mechanism 210 in FIG. 2, analyzing the data of imported data set to identify subsets of data, if any, and to further identify values of the data or subsets of data and infer a data type based on the data values themselves.

The process generates a first control type for the inferred first data type at operation 308. The first control type is generated by a component, such as control generator 212 in FIG. 2, identifying a default control type for the inferred first data type, or mapping the inferred first data type to one or more possible control types, or otherwise determining a suitable control type for the inferred first data type. In some examples, the process generates the first control type based at least in part on user profile data or telemetry data, which may inform on past user selections for control types and associated data types, or frequently used control types for specific data types.

The process determines whether there is another subset of data in the imported data set at operation 310. In response to a determination that there is not another subset of data, the process generates a layout using the first control type and the imported data set at operation 312, with the process terminating thereafter.

In response to a determination that there is another subset of data in the imported data set, the process infers a second data type from the data set at operation 314, and generates a second control type for the inferred second data type at operation 316. As an example, the inferred first data type may be a string data type, and the first generated control type may be a text box control, while the inferred second data type may be a date data type and the second generated control type may be a calendar control. Generating the control type for the inferred data type binds the associated data of that data type to the control in the automatically generated application, such that when the application document is provided, the data associated with the first data type is visually exposed via the a control of the first control type.

The process then determines if there is another subset of data in the imported data set at operation 318. If the process determines that there are no other subsets of data to infer data types and generate controls for, the process generates a layout using the generated control types and the imported data set at operation 320, with the process terminating thereafter. If the process determines that there is another subset of data in the imported data set, the process may iteratively infer next data types for next subsets of data at operation 322, generate next control types for the inferred next data types at operation 324, and return to operation 318 to determine if any subsets of data remain before moving to operation 320 and generating the layout using the generated control types and the imported data set.

Although first and second inferred data types are discussed, with first and second generated control types, any number of data types may be inferred and any number of control types may be generated using the imported data set. Additionally, the first generated control type may be different from the second generated control type based on the associated inferred data types.

Figure 4:
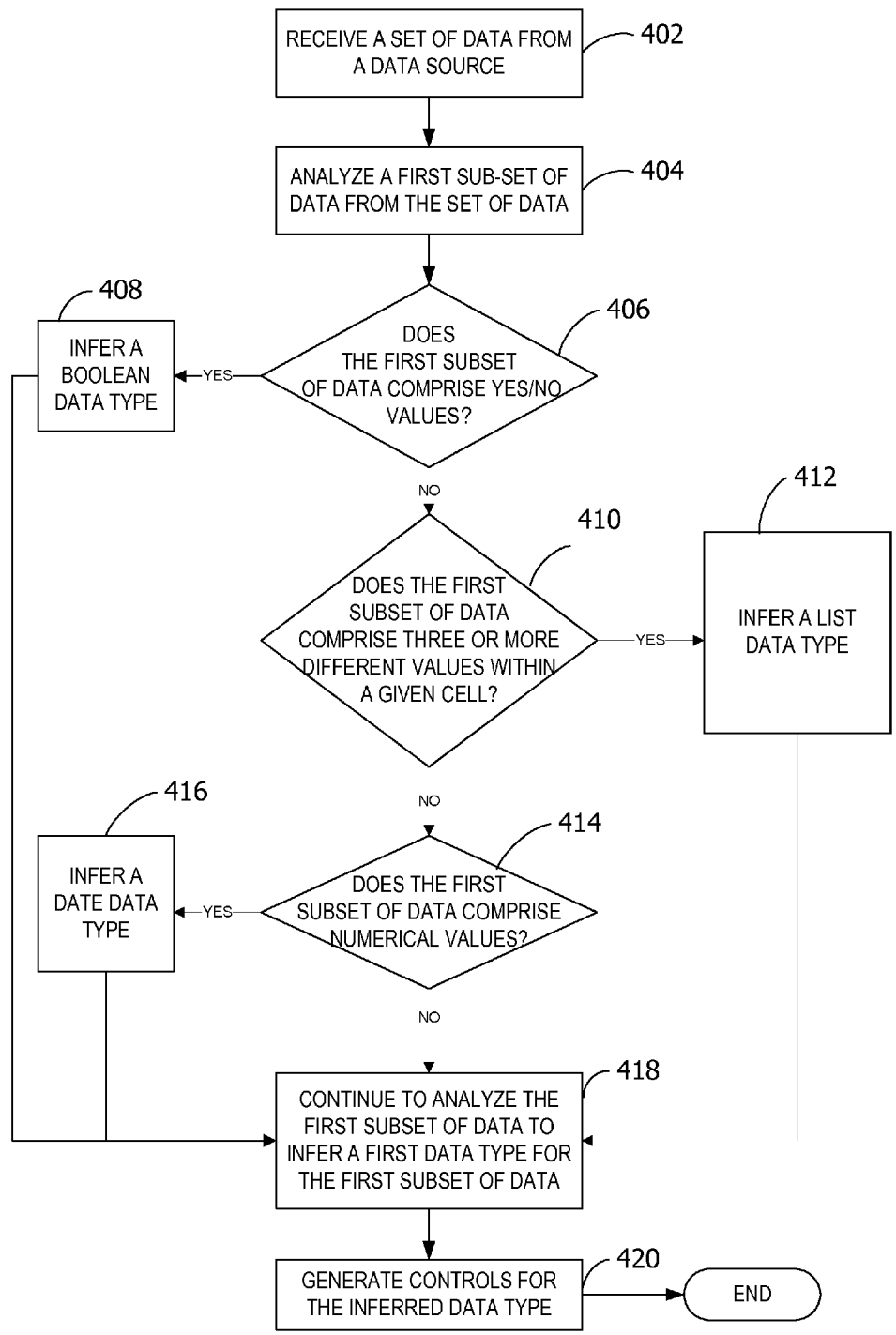
FIG. 4 is an exemplary flow chart illustrating operation of the computing device to infer data types and generate controls for the imported data.

FIG. 4 is an exemplary flow chart illustrating operation of the computing device to infer data types and generate controls for the imported data. The exemplary operations presented in FIG. 4 may be performed by one or more components described in FIG. 1 or FIG. 2, for example.

The process begins receiving a set of data from a data source at operation 402. The set of data may be any two dimensional flat table, such as a spreadsheet in some examples. In an illustrative embodiment, a user may select a stored spreadsheet from a data source, such as a cloud storage location, and an application may be automatically generated and designed using that selected spreadsheet based on analysis of the data within the spreadsheet by design logic, such as design logic 204 in FIG. 2. In other words, a user may receive an automatically generated application that is modifiable and provides interaction with the data of the spreadsheet by virtue of selecting the spreadsheet as the data set desired for the application.

The process analyzes a first subset of data from the set of data at operation 404. One or more subsets of data may be identified through design logic analysis of an imported data set, by parsing the data itself to identify subsets of data or different types of data, for example. The process determines whether the first subset of data comprises yes/no values at operation 406. In response to a determination that the first subset of data comprises yes/no values, the process infers a Boolean data type at operation 408.

If the process determines that the first subset of data does not comprises yes/no values, the process determines whether the first subset of data comprises three or more different values within a given cell at operation 410. If the process determines that the first subset of data does comprise three or more different values, the process infers a list data type at operation 412. If the process determines that the first subset of data does not comprise three or more different values, the process determines whether the first subset of data comprises numerical values at operation 414. If the process determines that the first subset of data does comprise numerical values, based on the actual numerical values of the first subset of data, the process infers a date data type at operation 416. In this illustrative example, the analysis of the data goes beyond identifying alphanumeric characters, analyzing the data itself to infer a data type based on the actual data. In the example of numerical values, the inference of a date data type may be based on the identification of numerals, the format of the numerals, the sequence of the numerals, the actual numerals used, in addition to user profile and/or telemetry data.

If the process determines that the first subset of data does not comprise numerical values, the process continues to analyze the first subset of data to infer a first data type for the first subset of data at operation 418. Any number of different values may be identified in the received set of data, beyond the examples contemplated here for illustrative purposes. For examples, values may include an image, a universal record locator (URL), global positioning system coordinates, or any other suitable data that may be analyzed for inference of a data type.

The process generates controls for the inferred data type at operation 420, which are used along with a generated layout to automatically generate an application document from the received set of data.

FIG. 5 is an exemplary table illustrating a data control table for mapping inferred data types to control types. Data control table 500 may be an illustrative example of one embodiment of data control table 232 in FIG. 2. Data control table 500 provides mapping between data types and one or more control types, which may be used by a control generator to identify a default control or a learned control type for an inferred data type, in these examples.

For illustrative purposes, data control table 500 provides example data types, default control types and other control types. A default control type may be a control type preconfigured as a default control type selection for a data type, a control type selected as a learned match control for a data type based on telemetry data, a control type selected as a user-preferred control type for a data type based on user history and/or machine learning, or any other suitable determination of a default control type.

In this example, a date data type may map to a calendar control type and a label control type. A calendar control type may be a default control type, while a label control type may be another compatible control type for the date data type, such that a user modification may be received to change the calendar control type to a label control type for the identified date data type, in some examples. An inferred data type of "address" may be compatible with a map control type and a picture control type, such that a default selection of a control generator may be to generate a map control for address data types, while a image capture of the address data type, such as via optical character recognition (OCR) for example, may also map to a picture or image control type.

A string control type may map to a text box control in some examples, and a gallery control type in other examples. An image data type may have a default control type of a picture control, but may also be compatible with a text box control, such as an image capture in combination with OCR data for example. Boolean data may map to a toggle switch, in this example, while a list data type maps to a drop down menu or a gallery.

The data types, control types, and mapping possibilities illustrated in data control table 500 are provided as an illustrative example of one type of table that may provide associations between data types and control types. The examples provided in FIG. 5 do not impose any limitations on the data types that may be inferred, or the control types that may be generated, by aspects of this disclosure.

Figure 6:
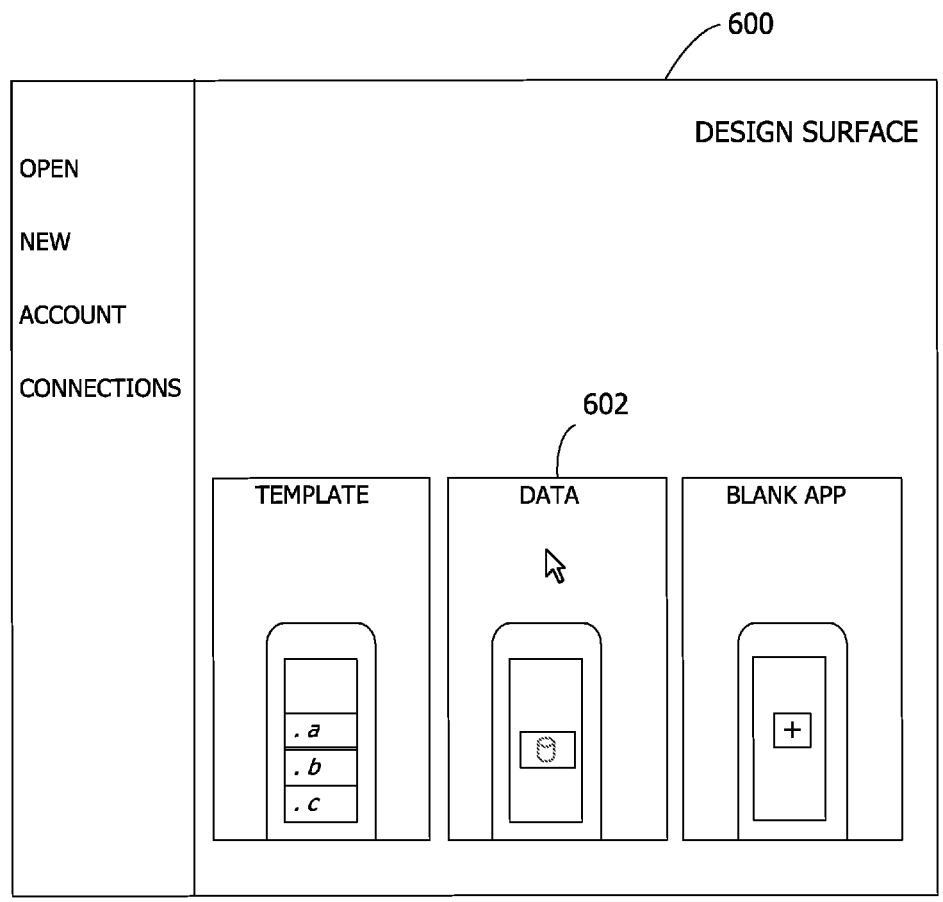
FIG. 6 is an exemplary diagram illustrating an interactive design surface.

FIG. 6 is an exemplary diagram illustrating an interactive design surface, such as design surface 202 in FIG. 2. Design surface 600 may be an illustrative example of a graphical user interface displaying a developer environment, for example.

Design surface 600 may include a data component 602, which may be a selectable component to enter an application-from-data mode of an application designer. Data component 602 may be one example of a design tool, such as design tools 206 in FIG. 2. Selection of data component 602 may provide an interactive connections list of data sources, such as data sources 112, for example.

Figure 7:
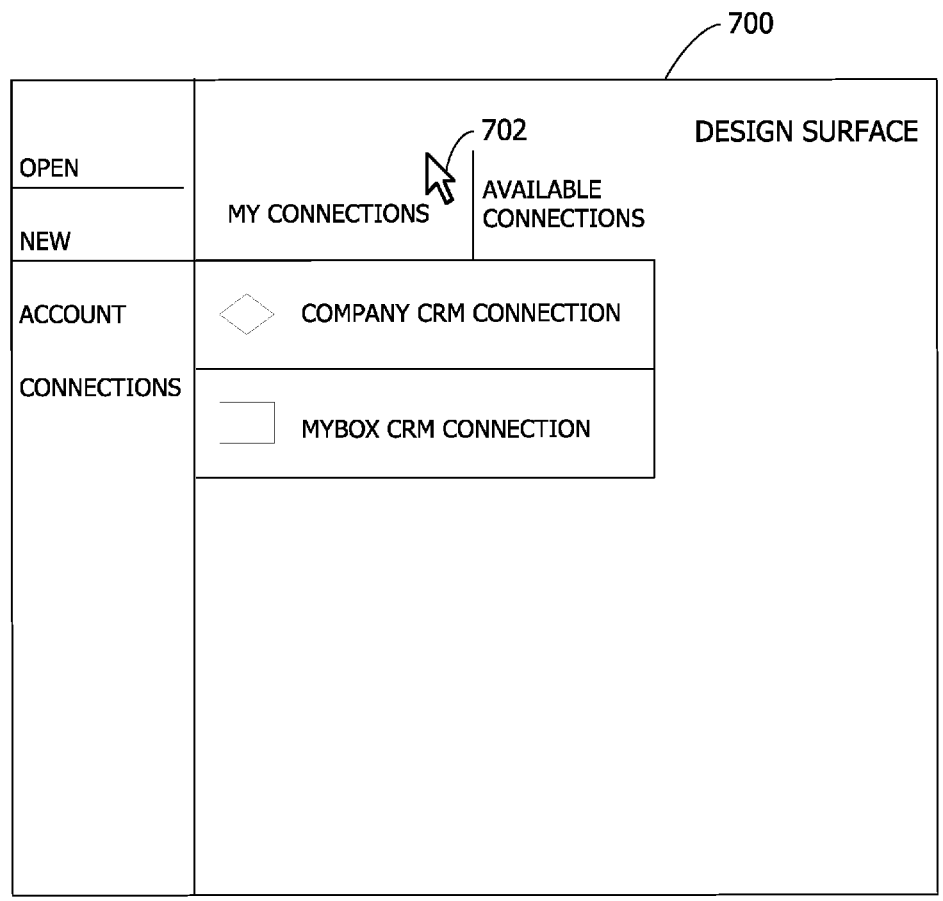
FIG. 7 is an exemplary diagram illustrating an interactive design surface for identifying a data source for application design.

FIG. 7 depicts an exemplary diagram illustrating user selection of a data source for generating an application from data. Design surface 700 illustrates a design surface displaying a connections list for data sources previously connected or known to the developer environment based upon user selection 702 of known connections, depicted as "my connections." Data sources may be known to the developer environment based on user credentials, past user connections, discovered connections, or any other suitable means.

Figure 8A:
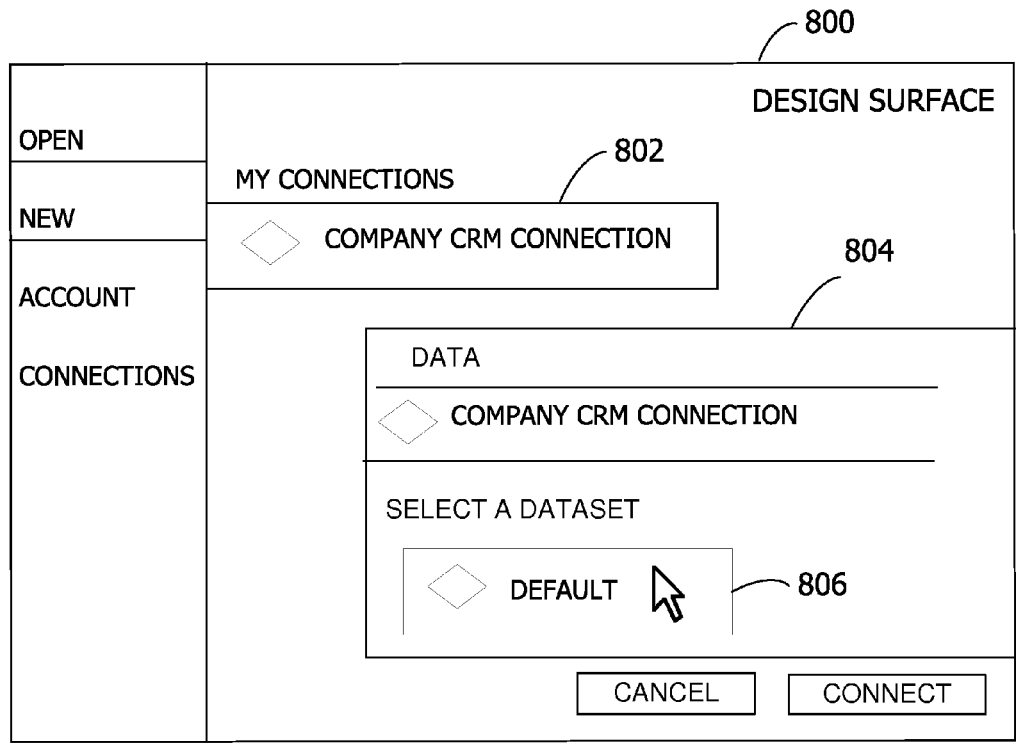
FIGS. 8A & 8B are exemplary diagrams illustrating an interactive design surface for identifying a data set for application design.
Figure 8B:
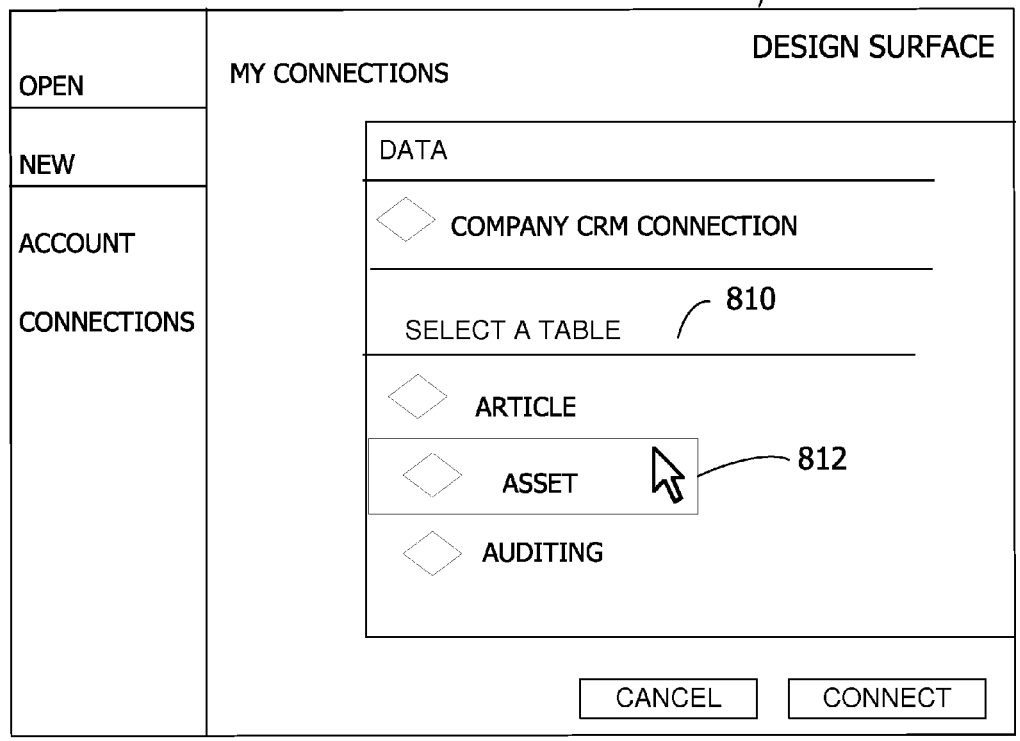

FIGS. 8A & 8B depict exemplary diagrams illustrating user selection of a data set for application design via an interactive design surface. Design surface 800 illustrates a selection of data source 802, which exposes datasets 804 of the selected data source. Datasets 804 may provide a list of selectable sets of data, such as individual files for example. User selection of dataset 806 may provide design surface 800 to display selectable tables, or other subsets of data from dataset 806, which may be selected as the data for import and application generation. In this illustrative example, list of tables 810 provides an interactive visual list for selection of a dataset to import. Here, asset dataset 812 is selected, and may be used to automatically generate an application.

FIGS. 9A, 9B, 9C, 9D, 9E, and 9F depict exemplary diagrams illustrating an interactive design surface for providing a modifiable application document from the selected set of data. Design surface 900 is depicted throughout FIGS. 9A-9F as providing different views and exposing different functionality for modification of an automatically generated application document from data. Modifications, or editing capabilities, may occur as local updates or remote updates, in some examples. Local updates are recorded, analyzed, and processed on the client hosting the generated application, in some cases by leveraging local compiled rules, updating the document representation at the client based on the local updates. Remote updates, which may involve more complex operations by a document server or specific changes to an application, involve sending design changes to a developer environment.

As an example, remote updates may include editing a layout, which involves a client device recording a user selection, which in turn makes a call to a document server storing the generated application document to remove the current layout and apply the new selected layout. Once these calls are made, the document server, which is maintaining the state of the application, in the document representation form calls the DocumentServices, CreateCompleteScreenLayout method, which updates the document representation of the application on the document server.

Remote updates to the application document via user modification may be incrementally compiled, with deltas of the changed application package sent to a client device. This may be enabled by the client sending the server hashes of the local state of the application files, and then receiving the incremental updates from the document server to update the preview version of the user's application in real time.

Local updates, for example, may include theme switching. Theme switching may be achieved by the local update of the application code on a client device itself, however, the client may still notify the document server to maintain the correct server representation as well as to retrieve compiled rules. The client records user actions, uses compiled rules to generate JavaScript or other suitable code, which the application may then execute to produce the desired result. This also enables other clients listening to the application document to receive the updates made on the active client.

Figure 9A:
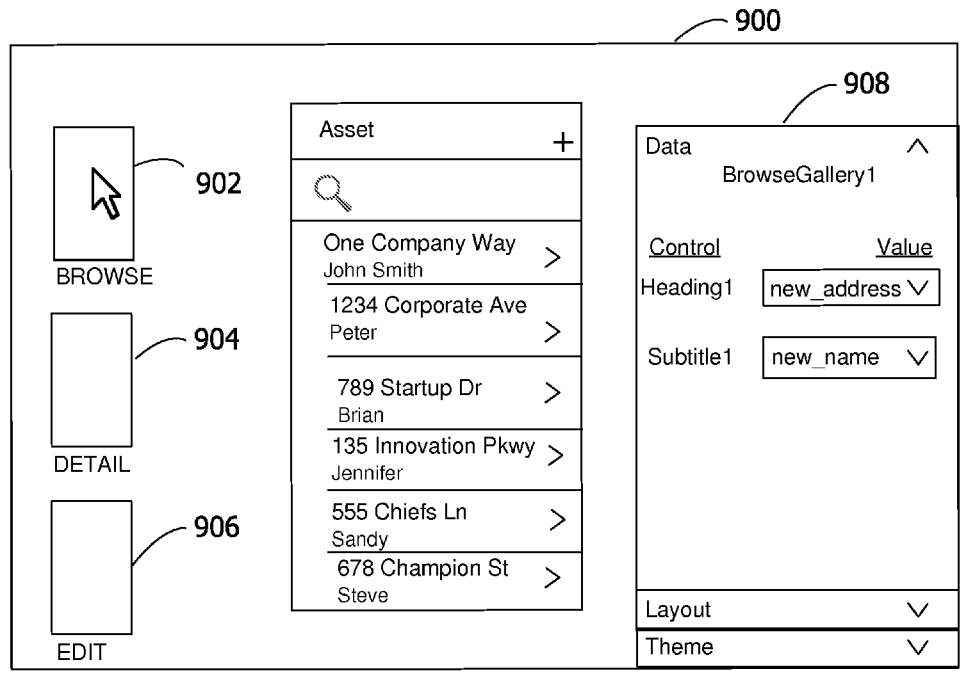
FIGS. 9A, 9B, 9C, 9D, 9E, and 9F are exemplary diagrams illustrating an interactive design surface for providing a modifiable application document.

Referring to FIG. 9A, browse form 902, detail form 904, and edit form 906 are illustrative examples of forms 246 in FIG. 2, which may be automatically generated as part of application document 238 generated using dataset 224. Design logic 204 may use one or more algorithms from set of policies 126 to map the imported data set 224 to one of a set of available target layouts. The design logic may identify and/or infer data types, data constraints, and layout constraints in determining a layout to select for the application document. In some examples, metadata of the input data set may also be considered as part of the layout selection determination.

The browse form 902 is selected, in this example, to provide a view of the imported data, the visual layout of the data, and any selected theme for the application. Data window 908 visually exposes the control type and corresponding values from the imported data.

Figure 9B:
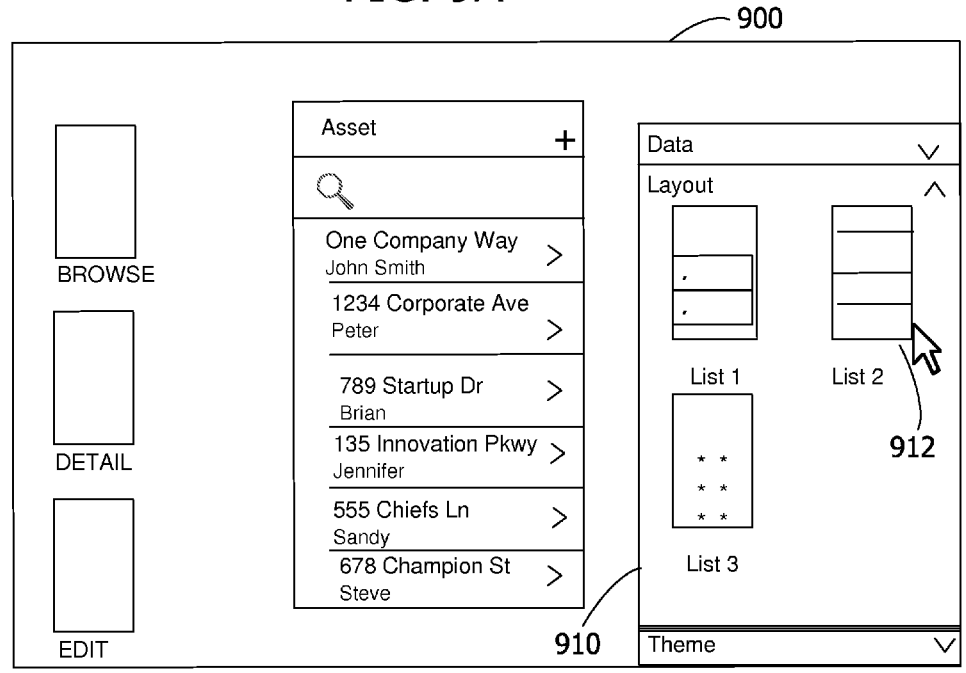

Referring now to FIG. 9B, layout window 910 visually exposes the layout of the controls within the application, and the data within the controls. Layout window 910 may provide selectable layout options to allow a user to customize or change the visual appearance of how data is arranged within a control, or to otherwise customize the visual appearance or location of controls within the application. In this example, list-2 912 may be a currently selected layout of a list control, providing for the arrangement of data within the list control type. A user may select an alternative layout option to change the arrangement of data with the list control of the application during user customization of the automatically generated application document. User customization of the generated application document may be facilitated using the forms, such as browse, detail, and edit, as well as associated windows, such as data window, layout window, and theme window, for example. In this way, a user may customize an application to obtain a desired visual appearance, manage how data is accessed within the application, or with which controls, and so on, providing a modifiable application document for future customization as desired.

Figure 9C:
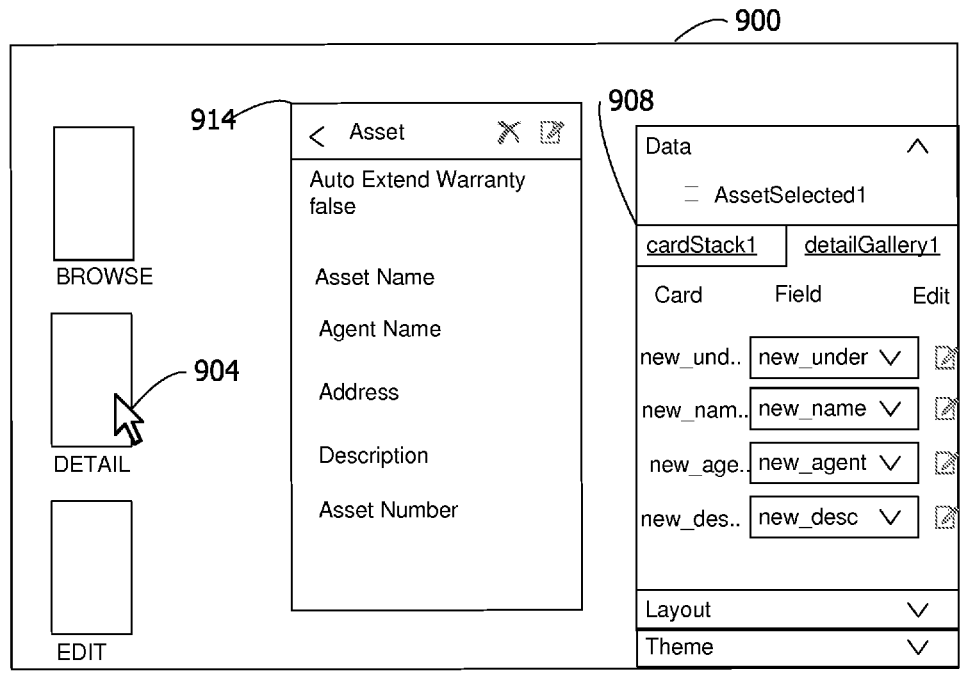

Referring now to FIG. 9C, selection of detail form 904 is depicted, which may expose a record detail 914. Record detail 914 displays how a drill-down into a record of the imported data visually appears in the generated application, for example. Data window 908 provides visual exposure of the cards used in association with data capture fields, in this example.

Cards, as used herein, refer to a composite control with a predefined structure. Cards are composite in the sense that multiple aspects of a value obtained from the input data set are being tracked and represented visually. These aspects include, but are not limited to: whether the value is desired for inclusion by the connection or the data set for validation purposes; whether the value has numeric boundaries and what those boundaries are; whether the text value has length limits, and what those limits are; whether a larger operation in the generated application interacting with the input data set has produced errors related to the specific value, and what those errors are; and so on. As one example, one or more cards may be preconfigured user interface elements for data input capture, such as a text field input box for example. As another example, cards may be thought of as a visual representation for a value of a certain type coming from one column of one row of a data set. Cards are specific to data types and tie into the auto-generated controls of the application. Cards will consume and produce data for the underlying data set to which they are bound, for example.

Some exemplary cards may include, without limitation, ink to character recognition cards, dictation cards, audio cards, voice recognition cards, barcode scanner cards, quick response (QR) code scanner cards, image cards, numeric cards, or any other suitable composite control. Image cards, for example, will visually display images and other pictographic data. Numeric cards will visually show numeric information, for example as a formatted number or as a slider bar that enforces certain numeric boundaries.

Figure 9D:
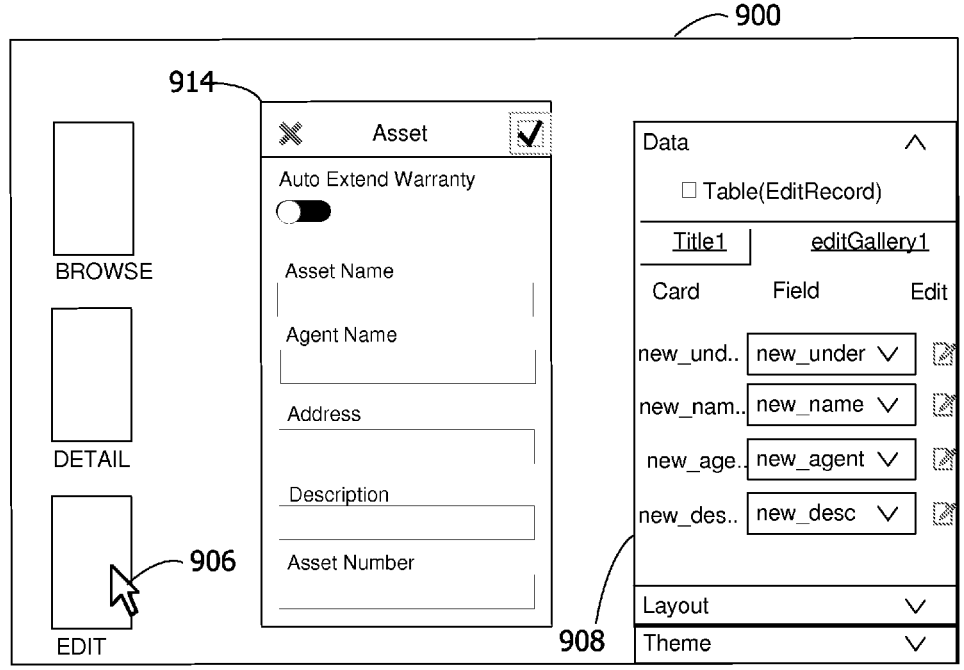

Referring now to FIG. 9D, selection of edit form 906 is depicted, which may expose record detail 914 in a modifiable, or edit, mode. Data window 908 adapts in response to selection of edit form 906 to display editable fields of record detail 914, in this example.

Figure 9E:
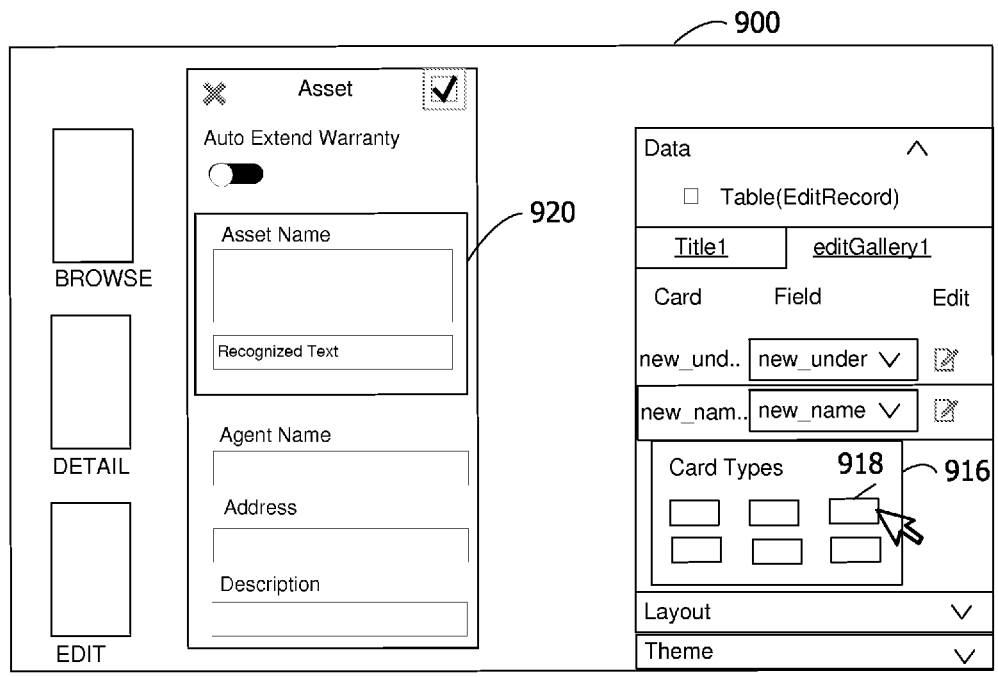
Figure 9F:
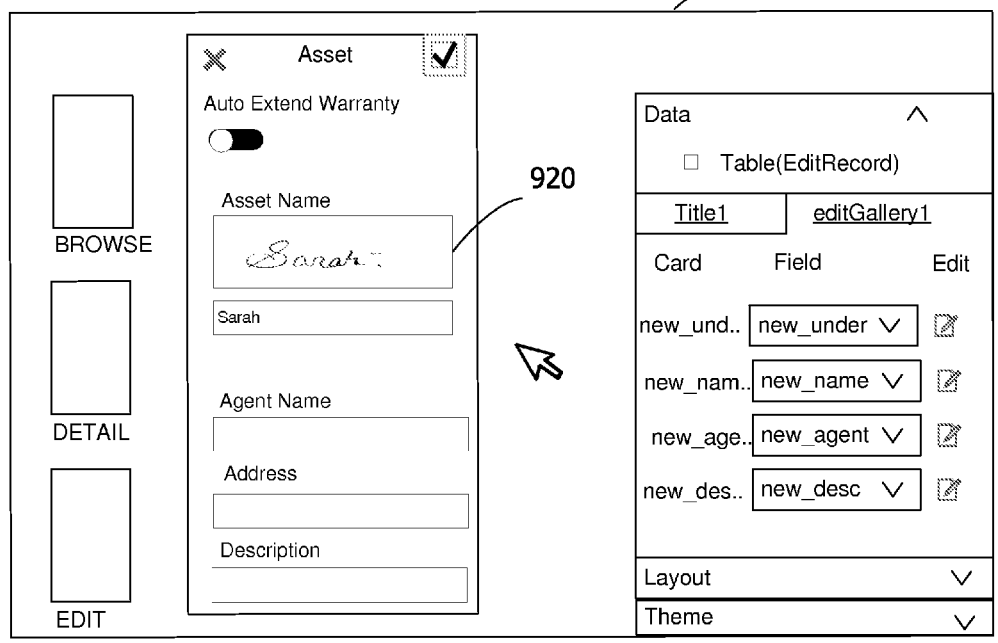

Referring now to FIG. 9E, within the edit mode of data window 908, selection of an editable field related to a card may be selected, exposing card types 916. Card types 916 may provide an interactive visual list of one or more card types suitable for the data field, for example. In this example, card 918 may be selected, which may be an OCR card type. Selection of card 918 in this example modifies the card type used for data capture field 920, such that at runtime (depicted in FIG. 9F) a handwritten signature may be captured in the data capture field 920 and the recognized text provided in the associated data field below.

FIG. 9A-9F depict just a small sample of the numerous examples by which an application document, automatically generated from data, may be modified and customized by a user via interaction with design surface 900.

Additional Examples

In some examples, an application generated from data may be further modified by adding additional pages, or screens, similar to how a user might interact with presentation software to add a slide to a slideshow. In this example, the design surface may have a design tool ribbon that includes an "insert page" tool, which upon selection, similar to selecting insert slide, adds a new page to the selected location between pages, or after/before a page of the generated application. In addition, layout selections, and other visual components, may be dragged and dropped onto the modifiable application document similar as that of a slide show screen in presentation software, leveraging the skills a user may already possess from previous interactions with presentation software into application development skills without the use of code or other developer expertise.

In other examples, data sources may include, without limitation, social media sources, customer relationship management (CRM) systems, databases, software as service (SAS) sources, cloud storage sources, or any other suitable data source. Data sets may include, without limitation, worksheets, tables, customer relationship management (CRM) tables, database records, or any other suitable sets of data.

User intent for generated controls, as well as layouts, and even themes may also be inferred based on telemetry or machine learning. In an example scenario, a default layout for a user may be based upon machine learning from past user behavior, or based on telemetry for a new user.

In addition, other forms, or pages, of the automatically generated application document are contemplated by this disclosure. For example, although three forms are illustrated, another form may be a dashboard form, or dashboard page, of an automatically generated application from data. The dashboard form may provide a summary view of the data that may be viewed or browsed in the browse screen, or may provide another visual summary of the data as a whole that the generated application is designed around. For example, another visual summary could be a status or a chart, for example, providing an overview of the data within the application Alternatively or in addition to the other examples described herein, examples include any combination of the following:

wherein at least one of the inferred first data type and the inferred second data type is inferred based on user profile data;

wherein at least one of the inferred first data type and the inferred second data type is inferred based on telemetry data;

receiving a selection of a third control type for the second data type, the third control type being different from the second control type;

re-generating the layout that includes the first control type and the third control type;

generating the application document using the generated layout, the application document including at least three forms;

wherein the at least three forms comprise a browsing form, a detail form, and an edit form;

wherein at least one of the inferred first data type and the inferred second data type is inferred based on a source data type within the first set of data from the data source;
wherein the data source is a spreadsheet, and wherein the inferred first data type is inferred based on one or more values in a first column of the spreadsheet;
wherein at least one of the inferred first data type and the inferred second data type is inferred based on metadata provided by a connection provider of the data source;
a data connection mechanism that identifies one or more data sources and provides the one or more identified data sources as a connection list to the design surface;
a theme manager that provides a list of themes to the design surface and applies a selected theme from the list of themes for the generated application document;
a data control table that provides a mapping between one or more data types and one or more control types;
wherein the received data set is a spreadsheet;
wherein the received data set is a number of tables;
wherein the generated application document is a template, and wherein the template is modifiable;
the data inference mechanism determining whether the first subset of data comprises yes/no values;
responsive to determining that the first subset of data comprises yes/no values, inferring a Boolean data type;
the data inference mechanism determining whether the first subset of data comprises three or more values;
responsive to determining that the first subset of data comprises three or more values, inferring a list data type;
the data inference mechanism determining whether the first subset of data comprises numerical values;
the data inference mechanism determining whether the first subset of data comprises numerical values.

In some examples, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 10:
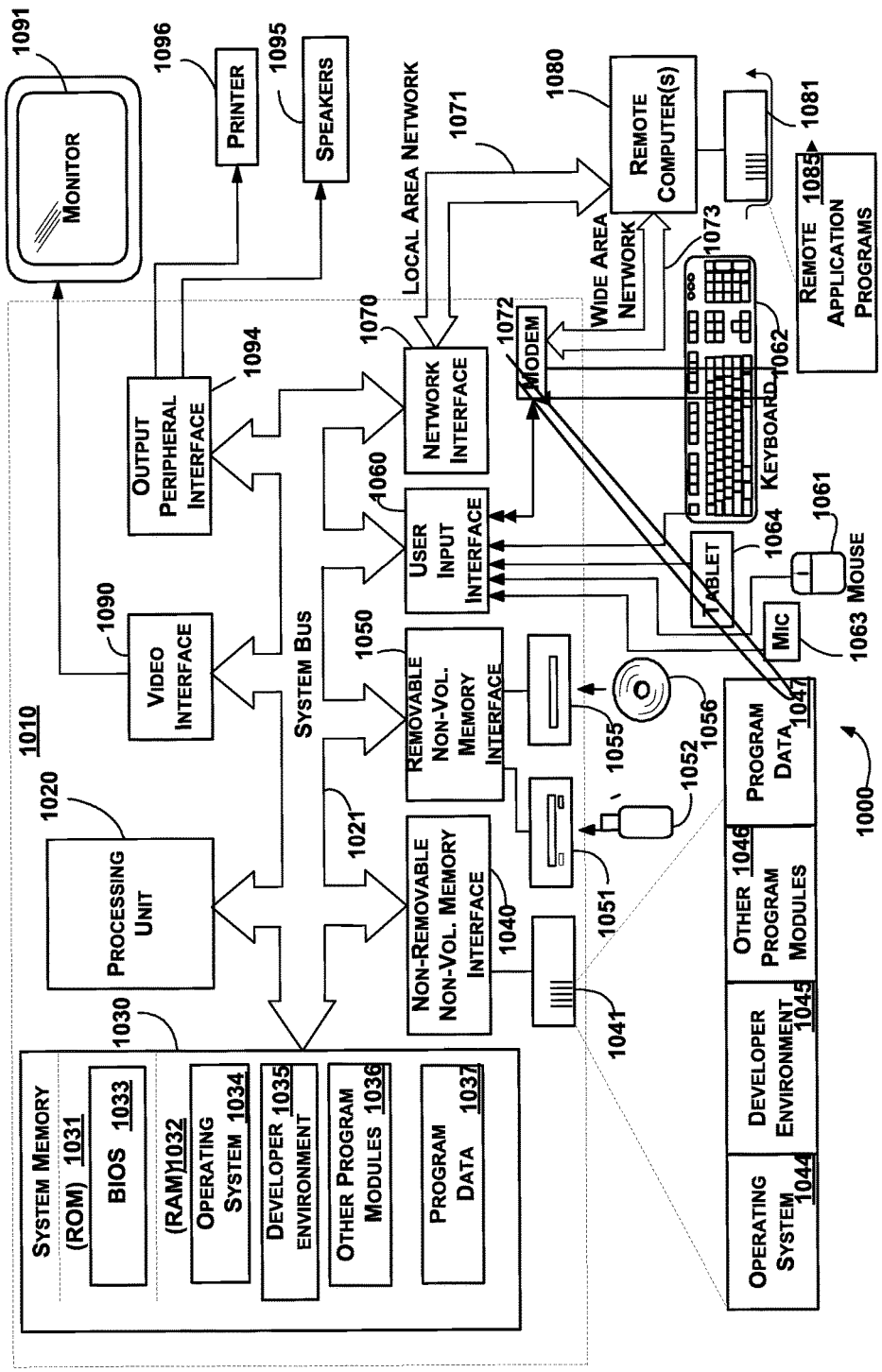
FIG. 10 is an exemplary block diagram illustrating an operating environment for a computing device implementing developer environment.

FIG. 10 illustrates an example of a suitable computing and networking environment 1000 on which the examples of FIG. 1 may be implemented. The computing system environment 1000 is only one example of a suitable computing environment and is not intended to suggest any limitation as to the scope of use or functionality of the disclosure. Neither should the computing environment 1000 be interpreted as having any dependency or requirement relating to any one or combination of components illustrated in the exemplary operating environment 1000.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 10, an exemplary system for implementing various aspects of the disclosure may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media may be any available media that may be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 1031 and 1032 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 1010. Computer storage media does not, however, include propagated signals. Rather, computer storage media excludes propagated signals. Any such computer storage media may be part of computer 1010.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs, such as developer environment 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a universal serial bus (USB) port 1051 that provides for reads from or writes to a removable, nonvolatile memory 1052, and an optical disk drive 1055 that reads from or writes to a removable, nonvolatile optical disk 1056 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and USB port 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, developer environment 1045, other program modules 1046 and program data 1047. Note that these components may either be the same as or different from operating system 1034, developer environment 1035, other program modules 1036, and program data 1037. Operating system 1044, developer environment 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel may be physically coupled to a housing in which the computing device is incorporated, such as in a tablet-type personal computer. In addition, computers such as computer 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

Figure 11:
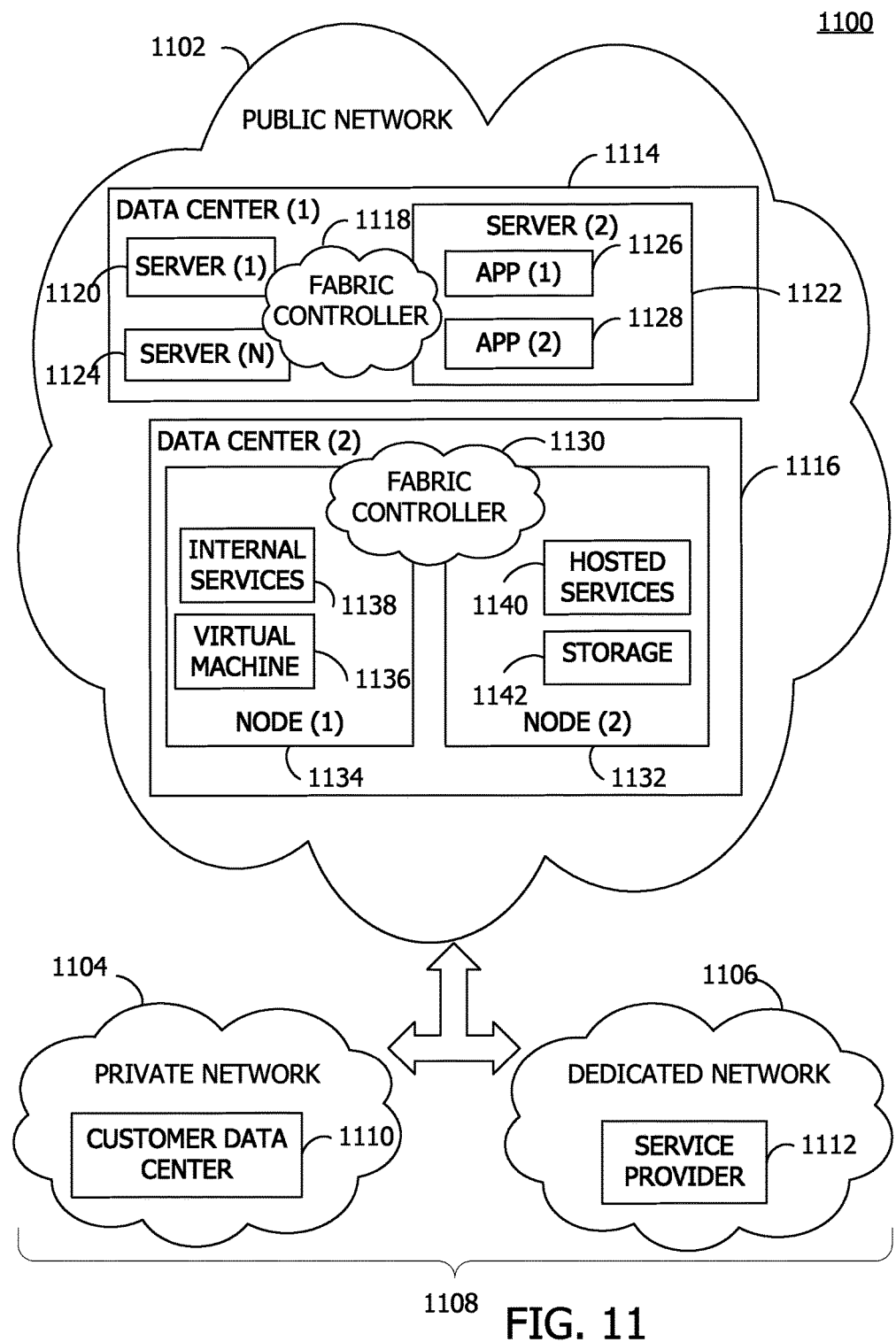
FIG. 11 is an exemplary block diagram illustrating a cloud computing environment for generating an application using a template.

With regard to FIG. 11, an exemplary block diagram illustrates a cloud-computing environment for application development. Architecture 1100 illustrates an exemplary cloud-computing infrastructure, suitable for use in implementing aspects of the disclosure. Architecture 1100 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 11 includes a public network 1102, a private network 1104, and a dedicated network 1106. Public network 1102 may be a public cloud, for example. Private network 1104 may be a private enterprise network or private cloud, while dedicated network 1106 may be a third party network or dedicated cloud. In this example, private network 1104 may host a customer data center 1110, and dedicated network 1106 may host an internet service provider 1112. Hybrid cloud 1108 may include any combination of public network 1102, private network 1104, and dedicated network 1106. For example, dedicated network 1106 may be optional, with hybrid cloud 1108 comprised of public network 1102 and private network 1104.

Public network 1102 may include data centers configured to host and support operations, including tasks of a distributed application, according to the fabric controller 1118. It will be understood and appreciated that data center 1114 and data center 1116 shown in FIG. 11 is merely an example of one suitable implementation for accommodating one or more distributed applications and is not intended to suggest any limitation as to the scope of use or functionality of embodiments of the present disclosure. Neither should data center 1114 and data center 1116 be interpreted as having any dependency or requirement related to any single resource, combination of resources, combination of servers (e.g. server 1120, server 1122, and server 1124) combination of nodes (e.g., nodes 1132 and 1134), or set of APIs to access the resources, servers, and/or nodes.

Data center 1114 illustrates a data center comprising a plurality of servers, such as server 1120, server 1122, and server 1124. A fabric controller 1118 is responsible for automatically managing the servers and distributing tasks and other resources within the data center 1114. By way of example, the fabric controller 1118 may rely on a service model (e.g., designed by a customer that owns the distributed application) to provide guidance on how, where, and when to configure server 1122 and how, where, and when to place application 1126 and application 1128 thereon. In one embodiment, one or more role instances of a distributed application may be placed on one or more of the servers of data center 1114, where the one or more role instances may represent the portions of software, component programs, or instances of roles that participate in the distributed application. In another embodiment, one or more of the role instances may represent stored data that is accessible to the distributed application.

Data center 1116 illustrates a data center comprising a plurality of nodes, such as node 1132 and node 1134. One or more virtual machines may run on nodes of data center 1116, such as virtual machine 1136 of node 1134 for example. Although FIG. 11 depicts a single virtual node on a single node of data center 1116, any number of virtual nodes may be implemented on any number of nodes of the data center in accordance with illustrative embodiments of the disclosure. Generally, virtual machine 1136 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 1136 may include processing capacity, storage locations, and other assets within the data center 1116 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 1130 is responsible for automatically managing the virtual machines running on the nodes of data center 1116 and for placing the role instances and other resources (e.g., software components) within the data center 1116. By way of example, the fabric controller 1130 may rely on a service model (e.g., designed by a customer that owns the service application) to provide guidance on how, where, and when to configure the virtual machines, such as virtual machine 1136, and how, where, and when to place the role instances thereon.

As discussed above, the virtual machines may be dynamically established and configured within one or more nodes of a data center. As illustrated herein, node 1132 and node 1134 may be any form of computing devices, such as, for example, a personal computer, a desktop computer, a laptop computer, a mobile device, a consumer electronic device, server(s), the computing device 100 of FIG. 1, and the like. In one instance, the nodes host and support the operations of the virtual machines, while simultaneously hosting other virtual machines carved out for supporting other tenants of the data center 1116, such as internal services 1138 and hosted services 1140. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 1102. The network cloud serves to interconnect resources, such as the role instances, which may be distributably placed across various physical hosts, such as nodes 1132 and 1134. In addition, the network cloud facilitates communication over channels connecting the role instances of the service applications running in the data center 1116. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

The examples illustrated and described herein as well as examples not specifically described herein but within the scope of aspects of the disclosure constitute exemplary means for automatically generating an application using data. For example, the elements illustrated in FIG. 1 and FIG. 2, such as when encoded to perform the operations illustrated in FIG. 3 and FIG. 4, constitute exemplary means for receiving a selection of a data source and importing a selected data set from the data source, exemplary means for inferring data types from the selected data set, exemplary means for generating control types for the inferred data types, and exemplary means for generating a layout using the generated controls and the selected data set when automatically generating an application from data.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for generating an application from data, the method comprising:
   importing a first set of data from a data source to a design surface;
   analyzing the first set of data from the data source to identify one or more subsets of data;
   inferring a first data type from the first set of data based on the analysis of the first set of data;
   identifying a default control type for the inferred first data type;
   generating a first control type based on the identified default control type for the inferred first data type;
   inferring a second data type from the first set of data;
   generating a second control type for the inferred second data type, wherein the first control type and the second control type are different; and
   generating a layout for an application document that includes the first control type and the second control type, wherein the layout is generated automatically without user or administrative intervention.

2. The method of claim 1, wherein at least one of the inferred first data type and the inferred second data type is inferred based on user profile data.

3. The method of claim 1, wherein at least one of the inferred first data type and the inferred second data type is inferred based on telemetry data.

4. The method of claim 1, further comprising:
   receiving a selection of a third control type for the second data type, the third control type being different from the second control type; and
   re-generating the layout that includes the first control type and the third control type.

5. The method of claim 1, further comprising:
   generating the application document using the generated layout, the application document including at least three forms.

6. The method of claim 5, wherein the at least three forms comprise a browsing form, a detail form, and an edit form.

7. The method of claim 1, wherein at least one of the inferred first data type and the inferred second data type is inferred based on a source data type within the first set of data from the data source.

8. The method of claim 7, wherein the data source is a spreadsheet, and wherein the inferred first data type is inferred based on one or more values in a first column of the spreadsheet.

9. The method of claim 1, wherein at least one of the inferred first data type and the inferred second data type is inferred based on metadata provided by a connection provider of the data source.

10. A system for generating an application from data, the system comprising:
    a design surface that receives a first set of data from a data source, the design surface implemented on a processor;
    a data inference mechanism, coupled to the design surface, that analyzes the first set of data from the data source to identify one or more subsets of data and infers a first data type and a second data type from the first set of data based on the analysis of the first set of data;
    a control generator that identifies a default control type for the inferred first data type and generates a first control type for the subset of data based on the identified default control type for the inferred first data type, and generates a second control type for the inferred second data type, wherein the first control type and the second control type are different; and
    a layout generator that generates an application document using the generated first control type and the generated second control type and the one or more subsets of data from the data set automatically without user or administrative intervention.

11. The system of claim 10, further comprising:
    a data connection mechanism that identifies one or more data sources and provides the one or more identified data sources as a connection list to the design surface.

12. The system of claim 10, further comprising:
    a theme manager that provides a list of themes to the design surface and applies a selected theme from the list of themes for the generated application document.

13. The system of claim 10, further comprising:
    a data control table that provides a mapping between one or more data types and one or more control types.

14. The system of claim 10, wherein the received first set of data is a spreadsheet.

15. The system of claim 10, wherein the received first set of data is a number of tables.

16. The system of claim 10, wherein the generated application document is a template, and wherein the template is modifiable.

17. One or more computer readable memories having computer-executable instructions stored thereon for generating an application from data, which, on execution by a computer, cause the computer to perform operations comprising:
    a data inference mechanism receiving a set of data from a data source;
    the data inference mechanism analyzing the set of data to identify one or more subsets of data;

the data inference mechanism inferring a first data type for an identified first subset of data based on the analysis of the first set of data and identifying a default control type for the inferred first data type;

the data inference mechanism sending the inferred first data type to a control generator for generating a first control based on the identified default control type for the inferred first data type;

the data inference mechanism inferring a second data type for an identified second subset of data; and the data inference mechanism sending the inferred second data type to the control generator for generating a second control for the inferred second data type, wherein the first control and the second control are different control types.

18. The one or more computer readable memories of claim 17, having further computer-executable instructions for:

the data inference mechanism determining whether the first subset of data comprises yes/no values; and responsive to determining that the first subset of data comprises yes/no values, inferring a Boolean data type.

19. The one or more computer readable memories of claim 17, having further computer-executable instructions for:

the data inference mechanism determining whether the first subset of data comprises three or more values; and responsive to determining that the first subset of data comprises three or more values, inferring a list data type.

20. The one or more computer readable memories of claim 17, having further computer-executable instructions for:

the data inference mechanism determining whether the first subset of data comprises numerical values; and responsive to determining that the first subset of data comprises the numerical values, inferring a date data type.

* * * * *